US008813130B2

(12) United States Patent
Yuki et al.

(10) Patent No.: US 8,813,130 B2
(45) Date of Patent: Aug. 19, 2014

(54) INFORMATION PROCESSING DEVICE AND INFORMATION PROVIDING METHOD

(75) Inventors: Taichi Yuki, Tokyo (JP); Satoshi Kanda, Tokyo (JP); Naoki Fukino, Kanagawa (JP); Yuichiro Takamizawa, Tokyo (JP)

(73) Assignee: Sony Corporation (JP)

( * ) Notice: Subject to any disclaimer, the term of this patent is extended or adjusted under 35 U.S.C. 154(b) by 761 days.

(21) Appl. No.: 12/321,867

(22) Filed: Jan. 27, 2009

(65) Prior Publication Data

US 2009/0193461 A1  Jul. 30, 2009

(30) Foreign Application Priority Data

Jan. 30, 2008  (JP) ................................ P2008-019486

(51) Int. Cl.
*H04N 5/445* (2011.01)
*G06F 3/00* (2006.01)
*G06F 13/00* (2006.01)

(52) U.S. Cl.
USPC .................... 725/43; 725/47; 725/52; 725/61

(58) Field of Classification Search
USPC ........................ 725/39–40, 44, 52, 43, 47, 61
See application file for complete search history.

(56) References Cited

U.S. PATENT DOCUMENTS

| | | | | |
|---|---|---|---|---|
| 5,630,119 | A * | 5/1997 | Aristides et al. ................ | 725/39 |
| 5,654,748 | A * | 8/1997 | Matthews, III .................. | 725/43 |
| 5,897,623 | A * | 4/1999 | Fein et al. ....................... | 725/40 |
| 6,281,940 | B1 * | 8/2001 | Sciammarella ................. | 725/38 |
| 6,392,709 | B1 * | 5/2002 | Orito ............................... | 725/40 |
| 6,526,577 | B1 * | 2/2003 | Knudson et al. ................ | 725/40 |
| 6,826,774 | B1 * | 11/2004 | Holme ............................. | 725/39 |
| 7,340,677 | B2 * | 3/2008 | Cowperthwaite ............... | 725/40 |
| 8,522,281 | B1 * | 8/2013 | Sahami et al. .................. | 725/37 |
| 2003/0005441 | A1 * | 1/2003 | Inoue .............................. | 725/39 |
| 2003/0106060 | A1 * | 6/2003 | Inoue .............................. | 725/40 |
| 2004/0268393 | A1 * | 12/2004 | Hunleth et al. ................. | 725/44 |
| 2005/0262533 | A1 * | 11/2005 | Hart et al. ....................... | 725/40 |
| 2007/0107015 | A1 * | 5/2007 | Kazama et al. ................. | 725/39 |
| 2008/0046932 | A1 * | 2/2008 | Stallings et al. ................ | 725/37 |
| 2008/0320536 | A1 * | 12/2008 | Kim et al. ...................... | 725/109 |

FOREIGN PATENT DOCUMENTS

| | | |
|---|---|---|
| JP | 8-050541 A | 2/1996 |
| JP | 11-187329 A | 7/1999 |
| JP | 11-266408 A | 9/1999 |
| JP | 2000-112605 A | 4/2000 |
| JP | 2003-009013 A | 1/2003 |
| JP | 2003-018107 A | 1/2003 |
| JP | 2003-196236 A | 7/2003 |

(Continued)

*Primary Examiner* — Randy Flynn
(74) *Attorney, Agent, or Firm* — Lerner, David, Littenberg, Krumholz & Mentlik, LLP (57) ABSTRACT

The information processing device of the present invention includes: a display portion that displays objects that respectively performed a function assigned in advance by being selected; an operation portion that inputs operation information to select one of the objects; and a control portion that displays supplementary information linked to the object on the display portion, based on the operation information. The control portion, based on predetermined conditions, performs a first process to display first supplementary information on the display portion. If operation information is not newly input during a prescribed period of time after the first process is performed, the control portion performs a second process to acquire second supplementary information and display the second supplementary information on the display portion.

11 Claims, 8 Drawing Sheets

(56) References Cited

FOREIGN PATENT DOCUMENTS

| | | |
|---|---|---|
| JP | 2004-062646 A | 2/2004 |
| JP | 2005-038008 A | 2/2005 |
| JP | 2006-108929 A | 4/2006 |
| JP | 2006-140590 A | 6/2006 |
| JP | 2006-245703 A | 9/2006 |
| JP | 2006-253913 A | 9/2006 |
| JP | 2007-036726 A | 2/2007 |

* cited by examiner

INFORMATION PROCESSING DEVICE AND INFORMATION PROVIDING METHOD

CROSS REFERENCES TO RELATED APPLICATION(S)

The present application claims priority from Japanese Patent Application No. JP 2008-019486, filed in the Japanese Patent Office on Jan. 30, 2008, the entire content of which is incorporated herein by reference.

BACKGROUND OF THE INVENTION

1. Field of the Invention

The present invention relates to an information processing device and an information providing method for supporting the selection of an object to which functions have been allocated in advance.

2. Description of the Related Art

Recently, a system known as an electronic program guide (EPG) is being put to practical use for television broadcasts, in which a broadcast reception terminal acquires broadcast waves or an electronic program guide via the Internet and displays an electronic program guide on the screen. Program information, such as the name of the program, the broadcast start time, the broadcast end time, program contents, cast members and so on, is displayed on the electronic program guide, the information being displayed for each channel in order of the broadcast schedule. A user accesses the electronic program guide displayed on the broadcast reception terminal and selects the desired program for viewing.

On the broadcast reception terminal, when this kind of content information, such as the program etc. is selected for viewing, viewable channels are displayed, for example, as a table of icons, and the user performs a key operation of at least one of a cursor and an icon to use a graphical user interface (GUI) to select a channel, thus obtaining high ease of operation. Here, as a method for supporting channel selection suiting the preference of the user, a method is known in which current program information is displayed for the channel on which the cursor is position (as disclosed, for example, in Japanese Patent Application Publication No. JP-A-2006-245703 and Japanese Patent Application Publication No. JP-A-2006-140590).

SUMMARY OF THE INVENTION

However, in known art, the current program information only provides simple explanatory information, such as part of the program title and so on, making it difficult for the user to ascertain the contents of the program. Moreover, when the current program is close to the end of broadcast, the current program information is not at all useful to the user. Further, in known art, in order to display the next program information which is required by the user, it is necessary for the user to perform an additional operation.

Here, the present invention addresses the problems described above and provides a new and improved information processing device and information providing method that are capable of automatically supporting content selection by the user.

According to an embodiment of the present invention, there is provided an information processing device that includes: a display portion that displays objects that respectively performed a function assigned in advance by being selected, a function assigned in advance; an operation portion that inputs operation information to select one of the objects; and a control portion that causes supplementary information linked to the object to be displayed on the display portion, based on the operation information. The control portion, based on predetermined conditions, performs a first process to display first supplementary information on the display portion. When the operation information is not newly input during a prescribed period of time after the first process is performed, the control portion performs a second process to acquire second supplementary information and display the second supplementary information on the display portion.

According to the present invention, the first process is first performed when predetermined conditions are fulfilled, and the first supplementary information is provided to the user. Then, if a prescribed period of time elapses without any new operation being performed, the second process is performed, and the second supplementary information is provided to the user. In this way, the first supplementary information and the second supplementary information can be provided without any separate operation by the user.

Here, the information processing device is connected, via a communication network, to an information server that holds the second supplementary information. At that time, the control portion acquires the second supplementary information from the information server. In this way, it is not necessary to hold the second supplementary information in the information processing device, and it is possible to reduce the memory required inside the device.

The second supplementary information includes at least one of text detailed information, image information and video information that show a detailed description of content linked to the object. In this way, by acquiring information with a large data volume from the external information server, it is possible to reduce the memory required inside the device.

Also, the information processing device according to the present invention can further be provided with a detailed information recording portion that records the second supplementary information acquired from the information server. The control portion, before connection to the information server, determines whether the second supplementary information linked to the selected object is recorded in the detailed information recording portion. By doing this, unnecessary access to the external information server can be reduced. In this case, the required memory capacity may be minimized by deleting the information recorded in the detailed information recording portion at a predetermined timing and so on.

Moreover, the information processing device according to the present invention can be provided with a simple information recording portion that records simple information, which is the first supplementary information, for the content linked to the object.

A device setting function, for example, can be linked respectively to each of the objects. In this case, the control portion displays simple information relating to the setting function as the first supplementary information, and displays detailed information relating to the setting function as the second supplementary information. In this way, without any process being performed by the user, first, simple information relating to the setting function linked to the object is provided to the user, and detailed information is provided after a prescribed period of time has elapsed.

Further, a digital broadcast channel, for example, can be linked respectively to each of the objects. In this case, the control portion, depending on the connection status of the information processing device, may acquire the second supplementary information from at least one of the information server and broadcast waves. In this way, the second supplementary information can reliably be supplied to the user.

Moreover, the control portion, with respect to the channel linked to the selected object, may display on the display portion at least one of the second supplementary information for the current broadcast content that is the content currently being broadcast and the second supplementary information for the next content that is the content to be broadcast next.

Here, an information display area that displays the second supplementary information is displayed on the display portion. In this case, the control portion, based on progress information for the content currently being broadcast, determines a display ratio of the second supplementary information for the current broadcast content and the second supplementary information for the next content that are displayed on the information display area. For example, the control portion, as the broadcast of the current broadcast content progresses, may enlarge the display ratio of the second supplementary information for the next content in comparison to the display ratio of the current broadcast content on the information display area. By doing this, the information that the user is more likely to wish to know can be provided in greater volume.

Further, the control portion may, for example, perform the first process when one of the objects is positioned on a cursor to select the object.

According to another embodiment of the present invention, there is provided an information providing method including the steps of: displaying objects that respectively performed a function assigned in advance by being selected, inputting operation information to select the object; and controlling display of supplementary information linked to the object, based on the operation information. Here, the step of controlling display of supplementary information includes the steps of first performing a first process to display first supplementary information, based on predetermined conditions, and second performing a second process to acquire and display second supplementary information when a prescribed period of time has elapsed without newly inputting the operation information after the first process has been performed.

According to the present invention, in the displaying step, the first process is first performed when predetermined conditions are fulfilled, and the first supplementary information is provided to the user. Then, if a prescribed period of time elapses without any new operation being performed, the second process is performed, and the second supplementary information is provided to the user. In this way, the first supplementary information and the second supplementary information can be provided without any separate operation by the user.

According to the embodiments of the present invention described above, an information processing device and information providing method can be provided that are capable of automatically supporting content selection by the user.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

In the first embodiment of the present invention, a structure and functions of an information processing device that is provided in a broadcast reception terminal, such as a television, or an HDD recorder or DVD recorder that are connected to a display, will be explained. In a television that is provided with the information processing device according to the first embodiment, icons are displayed on a content selection screen on which a user uses EPG to select a program for viewing, the icons being objects indicating respective channels. The user can provisionally select an icon by moving at least one of a cursor and an icon to position the icon on the cursor. The user can then perform a predetermined operation to select the icon and start the desired viewing. The information processing device according to the first embodiment provides program-related information when the user selects a program.

First, the structure of the information processing device according to the first embodiment of the present invention will be explained with reference to FIG. 1. Note that FIG. 1 is a block diagram showing the structure of an information processing device 100 according to the first embodiment.

Figure 1:
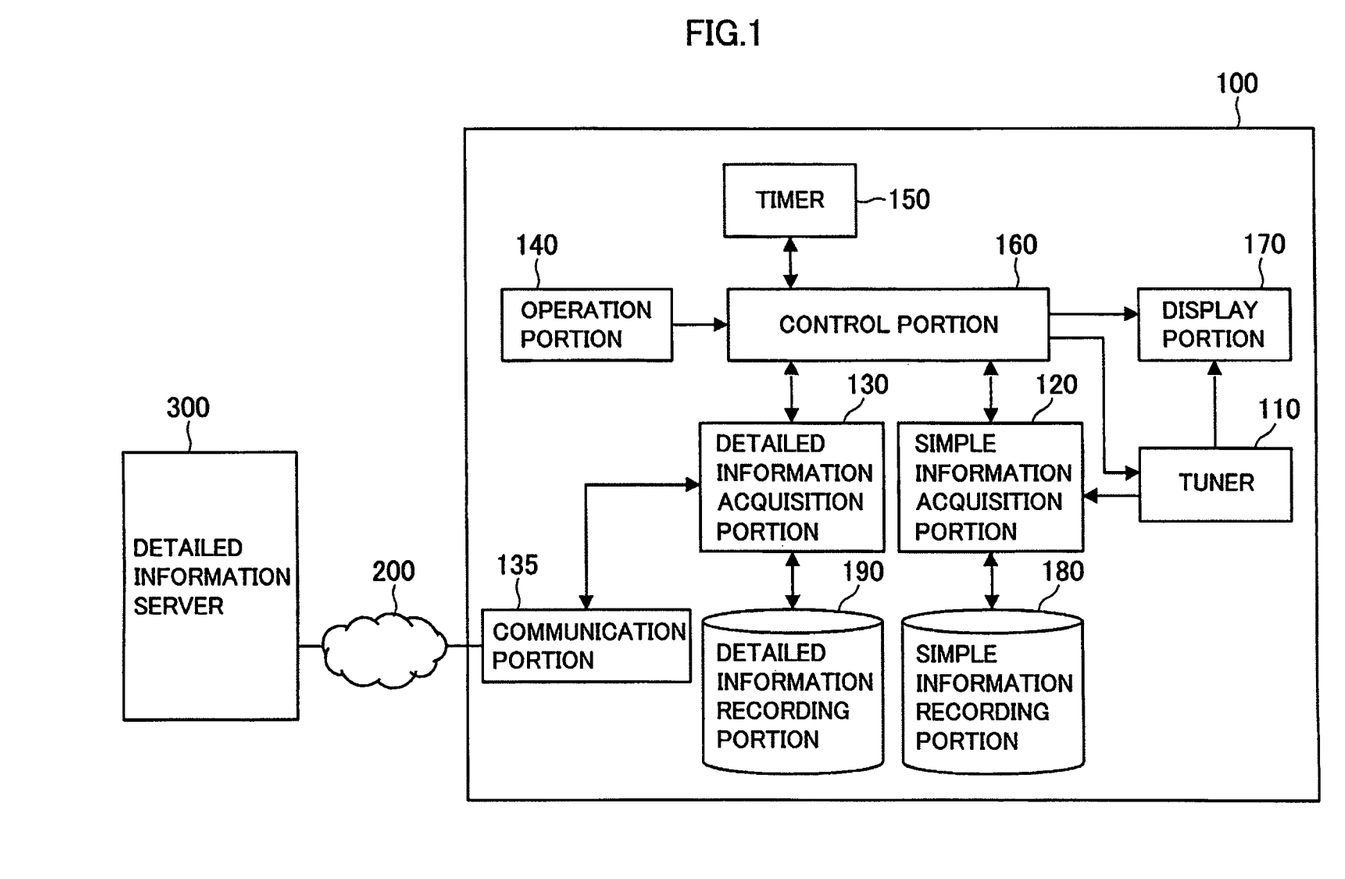
FIG. 1 is a block diagram showing a structure of an information processing device according to a first embodiment of the present invention.

As shown in FIG. 1, the information processing device 100 according to the first embodiment includes a tuner 110, a simple information acquisition portion 120, a detailed information acquisition portion 130, a communication portion 135, an operation portion 140, a timer 150, a control portion 160, a display portion 170, a simple information recording portion 180 and a detailed information recording portion 190.

The tuner 110 is a functional portion that receives a channel designated by the control portion 160 (to be described later), and decodes content information consisting of images, audio, program data and the like. The tuner 110 outputs the decoded content to the display portion 170 (to be described later) and, of the decoded content information, outputs the program data to the simple information acquisition portion 120 (to be described later).

The simple information acquisition portion 120 is a functional portion that records the program data output by the tuner 110 to the simple information recording portion 180 (to be described later). Based on instructions from the control portion 160, the simple information acquisition portion 120 also acquires predetermined program data from the simple information recording portion 180 and outputs the data to the control portion 160.

The detailed information acquisition portion 130 is a functional portion that, based on instructions from the control portion 160, acquires detailed information and outputs the detailed information to the control portion 160. The detailed information acquisition portion 130 according to the first embodiment is connected to the communication portion 135, which is connected, via a communication network 200, to a detailed information server 300 that stores detailed information. Based on instructions from the control portion 160, the detailed information acquisition portion 130 connects to the detailed information server 300 from the communication portion 135 via the communication network 200 and acquires predetermined detailed information. The detailed information acquisition portion 130 then outputs the acquired detailed information to the control portion 160 and also records the detailed information to the detailed information recording portion 190 (to be described later). Moreover, before connecting to the detailed information server 300, the detailed information acquisition portion 130 may access the detailed information recording portion 190 and check whether or not the predetermined detailed information is recorded there. If the predetermined detailed information is recorded, the detailed information acquisition portion 130 may acquire the detailed information from the detailed information recording portion 190 and output it to the control portion 160.

The operation portion 140 is an input portion for the user to perform an operation to select an icon displayed on the display portion 170 (to be described later). The operation portion 140 is, for example, a remote control unit that includes an "up key," a "down key," a "right key" and a "left key" which are used to move at least one of the cursor and the icons that are displayed on the display portion 170. The operation portion 140 also includes a "select key," which is used to select the icon on which the cursor is positioned, and the like. The operation portion 140 outputs the operation input by the user to the control portion 160 as operation information.

The timer 150 is a functional portion that manages elapsed time. The timer 150 sets a time period based on instructions input from the control portion 160, and when the designated time period has elapsed, the timer 150 notifies the control portion 160 that the time period has ended.

The control portion 160 is a functional portion used to perform controls in order to acquire information to be displayed on the display portion 170 (to be described later). Based on the operation information input from the operation portion 140, the control portion 160 detects channel information for the channel selected by the user, and outputs the channel information to the tuner 110. Based on the operation information input from the operation portion 140, the control portion 160 also acquires simple information or detailed information and outputs the simple or detailed information to the display portion 170.

The display portion 170 is a functional portion that displays the content information, such as images, audio and program data etc. that is output from the tuner 110 and the information that is output from the control portion 160. The display portion 170 can use, for example, a display and speakers and the like.

The simple information recording portion 180 is a recording portion that records simple information, and includes a memory such as a RAM or a hard disk, for example. In the simple information recording portion 180 is recorded simple information that is included in the content information acquired from the tuner 110, such as the content name, the broadcast start time, the broadcast end time, a content description and so on.

The detailed information recording portion 190 is a functional portion that records detailed information, and includes a memory such as a RAM or a hard disk, for example. In the detailed information recording portion 190 is recorded detailed information, which is acquired from the external detailed information server 300, and which includes a detailed description of the content, detailed information relating to the content, such as images, video and so on.

The information processing device 100 according to the first embodiment can use EPG to acquire an electronic program guide, and the tuner 110 receives simple information about each program which is distributed along with the electronic program guide. The tuner 110 outputs the received simple information to the simple information acquisition portion 120 and causes the simple information to be recorded in the simple information recording portion 180. Meanwhile, the information processing device 100 according to the first embodiment is connected to the detailed information server 300 via the communication network 200, such as the Internet, for example. The detailed information acquisition portion 130 can therefore acquire detailed information from the detailed information server 300 according to instructions from the control portion 160, and can record the detailed information to the detailed information recording portion 190. In such a way, the detailed information, which has a high data volume, is acquired when necessary, and the memory required inside a device can be reduced, thus allowing reductions in cost and energy consumption.

Figure 2:
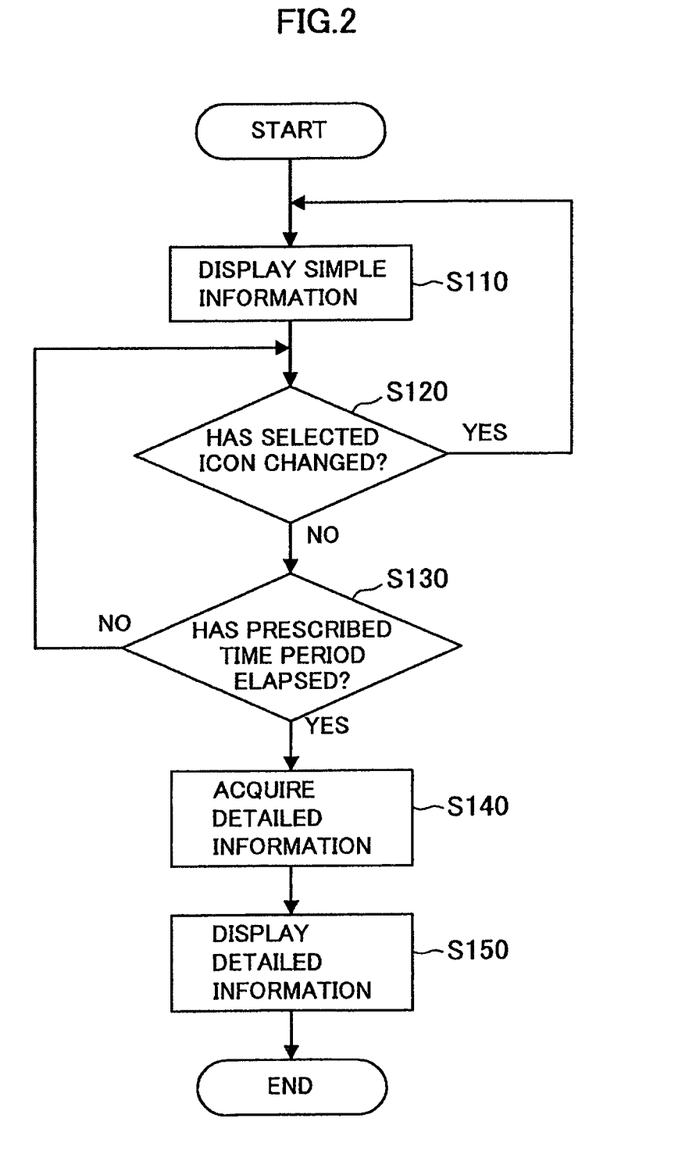
FIG. 2 is a flow chart showing an information display process by the information processing device according to the first embodiment.
Figure 3:
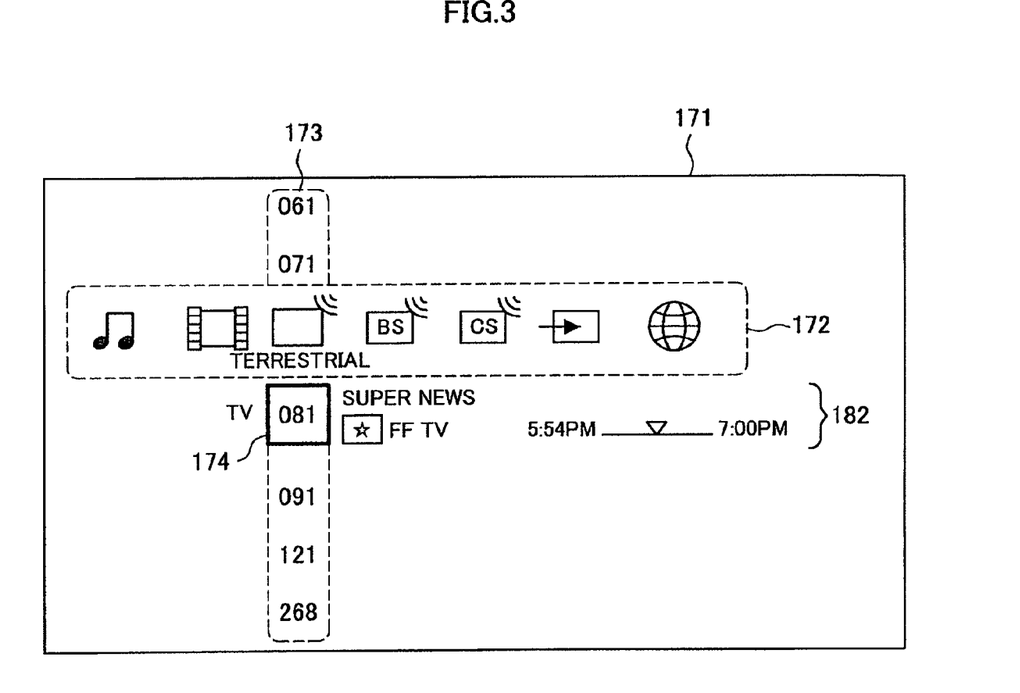
FIG. 3 is an explanatory diagram showing an example of a content selection screen displaying simple information according to the first embodiment.
Figure 4:
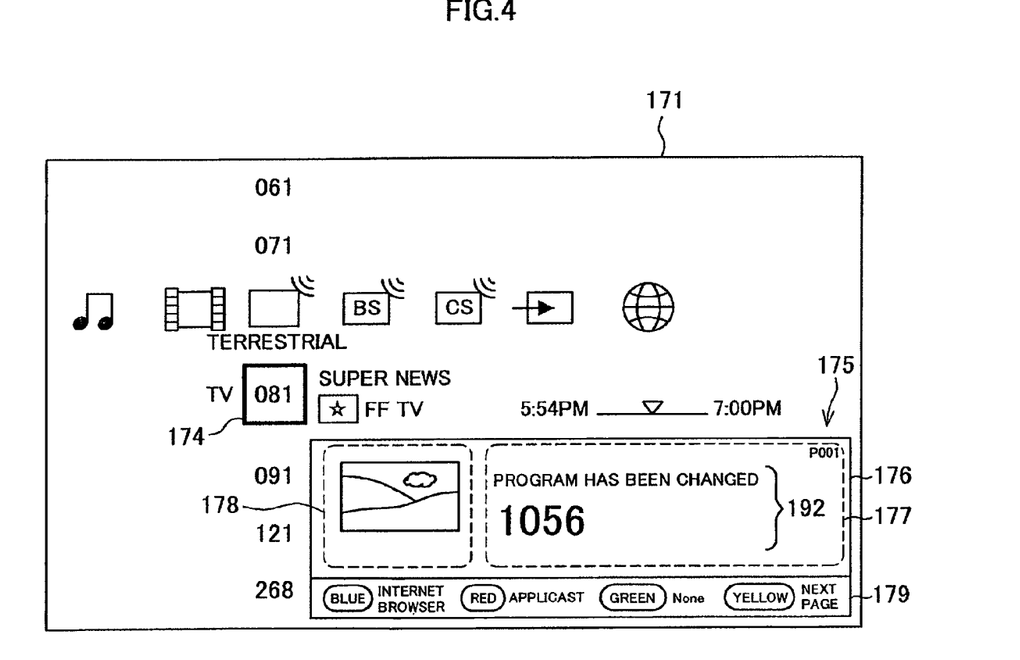
FIG. 4 is an explanatory diagram showing an example of a content selection screen displaying detailed information according to the first embodiment.

The structure of the information processing device 100 according to the first embodiment is described above. The information processing device 100 according to the first embodiment displays simple information (first supplementary information) that is linked to the icon positioned on the cursor on the display portion 170 and if the user does not perform any operation within a prescribed period of time, the information processing device 100 displays detailed information (second supplementary information) that is linked to the icon positioned on the cursor on the display portion 170. Now, an information display process by the information processing device 100 according to the first embodiment will be explained with reference to FIG. 2 to FIG. 4. Note that FIG. 2 is a flow chart showing an information display process by the information processing device 100 according to the first embodiment. FIG. 3 is an explanatory diagram showing an example of a content selection screen on which simple information is displayed. FIG. 4 is an explanatory diagram showing an example of a content selection screen on which detailed information is displayed.

The information display process shown in FIG. 2 is performed when prescribed conditions are fulfilled. The information display process is performed, for example, when the icon selected by the cursor from the operation portion 140 is changed on the content selection screen, or when new content is started due to an elapsed time period and so on. An example of the content selection screen displayed on the display portion 170 is shown in FIG. 3. Main category icons 172 are displayed on a content selection screen 171, the main category icons 172 being arranged in the horizontal direction of the screen. When one of the main category icons 172 is selected, sub-category icons 173 which are linked to the selected one of the main category icons 172 are displayed in the vertical direction of the screen. The user uses the operation portion 140 to move at least one of a cursor 174 and the icons displayed on the content selection screen 171 to select the icon corresponding to the required channel etc.

The information display process by the information processing device 100 according to the first embodiment first displays simple information linked to the icon positioned on the cursor 174 on the display portion 170 (step S110). In step S110, the control portion 160 acquires the simple information linked to the icon positioned on the cursor 174 from the simple information recording portion 180 via the simple information acquisition portion 120. The simple information, as described above, is transmitted to the information processing device 100 at a predetermined timing along with the electronic program guide, and is recorded in the simple information recording portion 180. The simple information acquired from the simple information recording portion 180 is output from the control portion 160 to the display portion 170. The simple information can be, for example, the program name, the broadcast time, the name of the broadcast station etc. for the program currently being broadcast. For example, as shown in FIG. 3, the program name, the broadcast time, the progress status etc. for the program currently being broadcast for the channel positioned on the cursor 174 are displayed on the display portion 170 content selection screen 171, as simple information 182.

At the timing at which the step S110 is performed, the control portion 160 outputs a time period setting instruction to the timer 150 that is an instruction to perform an end of time period notification after a prescribed period of time has elapsed. The timer 150 is set to determine whether or not an operation is performed in the prescribed period of time from when the simple information 182 is displayed. The prescribed period of time set on the timer 150 can be, for example, approximately 2 to 10 seconds. Further, the period of time set on the timer may be set in advance or may be set by the user.

Next, when an operation is input from the operation portion 140, it is determined whether or not the icon that is provisionally selected by the cursor 174 has been changed or not (step S120). If it is determined in step S120 that the icon has been changed, the timer 150 time period setting is made invalid, and the process from step S110 is once more repeated. On the other hand, if it is determined that the icon has not been changed, the process in step S130 is performed.

If it is determined in step S120 that the icon that is provisionally selected by the cursor 174 has not been changed, it is further determined whether or not the prescribed period of time has elapsed (step S130). Whether or not the prescribed period of time has elapsed is determined by whether or not the end of time period notification has been received from the timer 150. If it is determined that the prescribed period of time has elapsed, in other words, when the end of time period notification has been received from the timer 150, the process in step S140 is performed. On the other hand, if it is determined that the prescribed period of time has not elapsed, the process returns to perform the step S120.

When it is determined in step S130 that the prescribed period of time has elapsed, the control portion 160 acquires the detailed information to be displayed on the display portion 170 (step S140). The control portion 160 outputs a detailed information acquisition instruction to the detailed information acquisition portion 130 to acquire the detailed information that is linked to the icon positioned on the cursor 174. When the detailed information acquisition portion 130 receives the detailed information acquisition instruction, it first accesses the detailed information recording portion 190 and checks whether or not the detailed information linked to the relevant icon is recorded. If the detailed information is recorded in the detailed information recording portion 190, the detailed information acquisition portion 130 acquires the detailed information from the detailed information recording portion 190 and outputs it to the control portion 160.

On the other hand, if the detailed information is not recorded in the detailed information recording portion 190, the detailed information acquisition portion 130 accesses the detailed information server 300 from the communication portion 135 via the communication network 200, and acquires the detailed information. The detailed information is acquired from the detailed information server 300 based on, for example, the channel linked to the icon and the broadcast date and time. Then, the detailed information acquisition portion 130 outputs the detailed information acquired from the detailed information server 300 to the control portion 160.

Note that, to reduce the load on and the memory required in the information processing device 100, the detailed information recorded in the detailed information recording portion 190 may be deleted at a predetermined timing. The predetermined timing can be, for example, when a prescribed period of time has elapsed from acquisition of the detailed information, or when the remaining capacity in the detailed information recording portion 190 has reached a predetermined volume or less.

After that, the detailed information is displayed on the display portion 170 (step S150). The control portion 160 outputs the detailed information acquired from the detailed information recording portion 190 or from the detailed information server 300 to the display portion 170. The display portion 170 then displays the input detailed information. The detailed information is, for example, displayed in a predetermined area 175 displayed on the content selection screen 171 (hereinafter, the predetermined area is referred to as the "poster").

As shown in FIG. 4, the poster 175 is displayed, for example, in the bottom right area of the content selection screen 171, the area being delineated by the main category icons 172 and the sub-category icons 173. The poster 175 is, for example, formed of an information display area 176 on which is displayed detailed information 192 and an icon display area 179 on which are displayed operation icons to operate the poster 175. The information display area 176 is, for example, formed of a text display area 177 on which text information is displayed, and an image display area 178 on which images and video are displayed. The detailed information can be, for example, a detailed description of the program currently being broadcast on the channel that is provisionally selected, or a title screen, a digest video or the like, that offer more details relating to the program than the simple information and provide the user with more information. For that reason, it is desirable for the information display area 176 to allow not only the display of text information but also the display of images and the like.

Meanwhile, icons are displayed in the icon display area 179, such as an icon mapped to a process to start up an Internet browser, an icon mapped to a process to move to a next page when text information displayed in the text information display area 177 is formed of a plurality of pages and the like. The user can use the operation portion 140 to move at least one of the cursor and an icon to select the required icon and can thus perform the desired process.

The information display process by the information processing device 100 according to the first embodiment is described above. With the information processing device 100 according to the first embodiment, the simple information is displayed at a predetermined timing, for example, when a channel is provisionally selected, and the detailed information is displayed if another operation is not performed within a prescribed period of time from then. The user can therefore ascertain the detailed information after a prescribed period of time has elapsed, without performing a separate operation.

Figure 5:
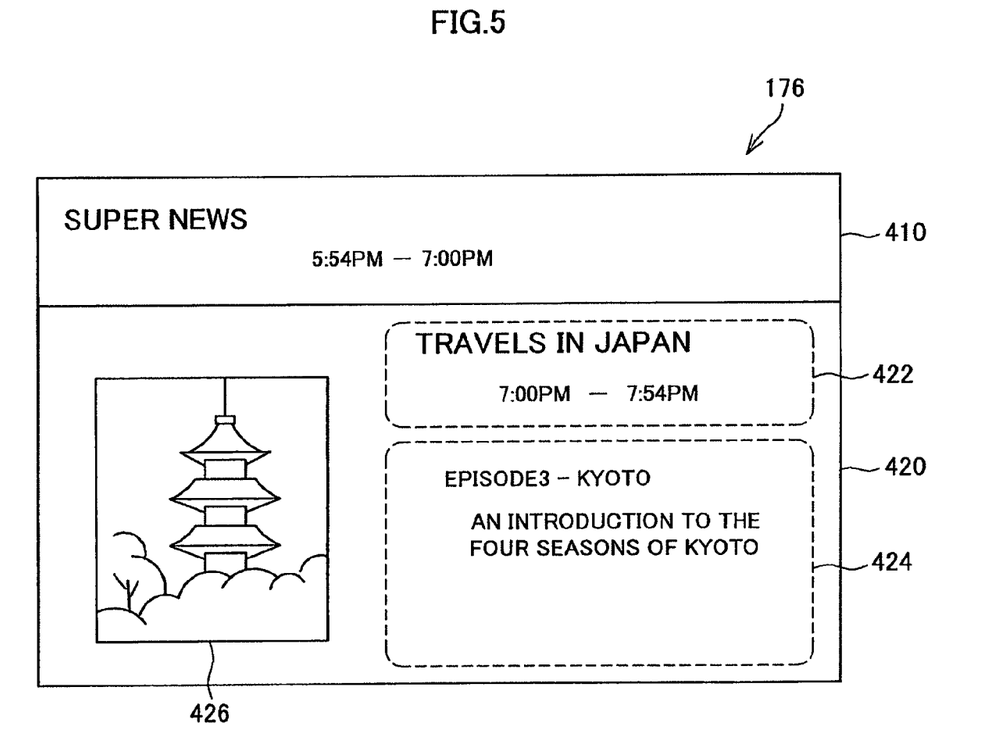
FIG. 5 is an explanatory diagram showing another example of a content selection screen displaying detailed information according to the first embodiment.

Here, as shown in FIG. 5, for example, information relating to the program currently being broadcast (the current broadcast content) and to the program to be broadcast next (the next broadcast content) may simultaneously be displayed on the information display area 176 of the poster 175. The information display area 176 shown in FIG. 5 has, for example, a current program information area 410 that displays information about the current program, and a next program information area 420 that displays information about the program to be broadcast next. The area size of the current program information area 410 and the next program information area 420 may be the same, or may be different, as shown in FIG. 5. The area sizes can have, for example, a ratio that is set in advance, or can be determined according to a ratio that is determined based on certain conditions. As the larger of the areas displaying the information can display more information, when the ratio is made variable, the information which is thought most likely to be required by the user may be displayed in greater volume.

For example, the ratio can be determined based on the progress status of the current program. For example, if the current program has only just started, the display ratio of the current program information area 410 may be larger, while, if the current program is about to end, the display ratio of the next program information area 420 may be larger. Moreover, a predetermined ratio of the current program progress status may be used. For example, the display ratio of the current program information area 410 may be larger until the current program progress status exceeds 70% or more, and when 70% is exceeded, the display ratio of the next program information area 420 may be made larger.

Figure 6:
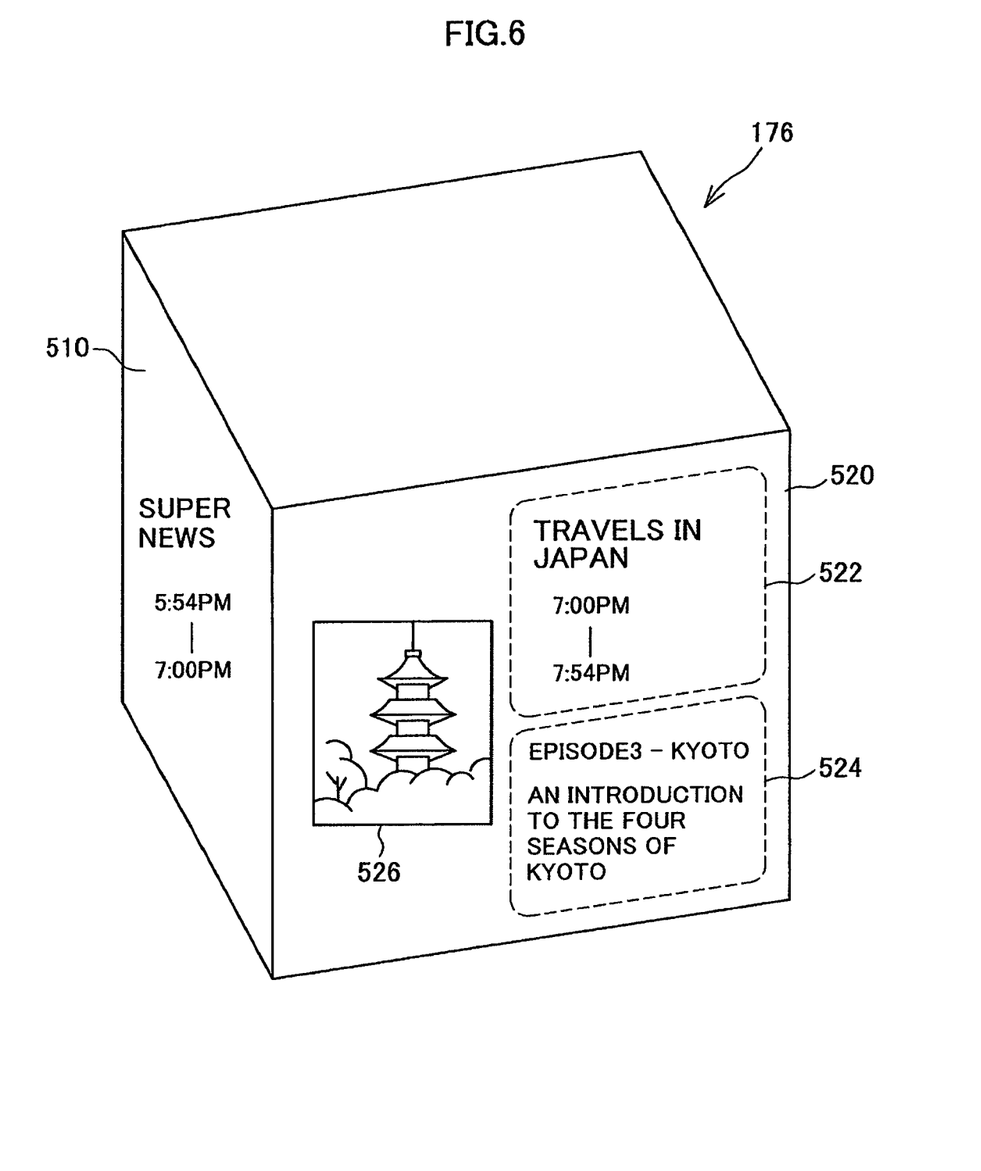
FIG. 6 is an explanatory diagram showing another example of a content selection screen displaying detailed information according to the first embodiment.

In FIG. 5, the next program information area 420 is set to be larger than the current program information area. As the area size of the current program information area 410 is small, the simple information only may be displayed, for example, or all or part of the detailed information text information only may be displayed. On the other hand, as the area size of the next program information area 420 is large, the simple information, and all or part of the detailed information is displayed. At this time, the next program information area 420 is formed to include display areas, for example, a simple information display area 422, a text display area 424 and an image display area 426 and the like.

in this way, when 2 sets of program information are displayed in the information display area 176, the information display area 176 may have, for example, a three-dimensional type shape, such as the cube shown in FIG. 6. The program information is displayed, for example, on a side surface of the cube. The initial display of the information display area 176 on the content selection screen 171 is set to display at least 2 side surfaces of the cube, with a current program information area 510 displayed on one side surface and a next program information area 520 displayed on another side surface. At that time, the area size of the current program information area 510 and the next program information area 520 can be changed by changing the orientation of the cube. In this case also, as for FIG. 5, the area sizes can be, for example, a ratio that is set in advance, or can be determined according to a ratio that is determined based on certain conditions.

When the information display area 176 has a three-dimensional shape, for example, if the user positions the cursor on the display area displaying the information that the user wishes to view (for example, the current program information area 510), the information display area 176 may be rotated to make the area size of the selected display area the largest. In this way, the information display area becomes larger, and more supplementary information can be provided relating to the information required by the user.

Further, in the above-described step S140, the detailed information is acquired from the detailed information recording portion 190 or the detailed information server 300. At that time, a process may be performed to verify whether or not there is a connection with the information processing device 100 and the detailed information server 300. If both the information processing device 100 and the detailed information server 300 are connected, the detailed information acquisition portion 130 accesses the detailed information server 300 and acquires the detailed information. On the other hand, if both the information processing device 100 and the detailed information server 300 are not connected, the detailed information acquisition portion 130 acquires the detailed information if the detailed information is recorded in the detailed information recording portion 190. Note that, if the information processing device 100 is not connected to the detailed information server 300 and if the detailed information is not recorded in the detailed information recording portion 190, the control portion 160 may, for example, acquire the simple information from the simple information recording portion 180 via the simple information acquisition portion 120, and cause the simple information to be displayed on the information display area 176.

Note that there are also cases when it is possible to acquire detailed information from each broadcast station using broadcast waves. In such a case, the control portion 160 may determine not only the connection status of the information processing device 100 and the detailed information server 300, but also determine the status of whether or not it is possible to acquire detailed information from each broadcast station. The detailed information is then acquired from at least one of the detailed information server 300 connected to the information processing device 100 and the broadcast station.

For example, first, the detailed information server 300 that is the connection destination set in advance is accessed. If access to the detailed information server 300 is successful, and if the detailed information exists in the detailed information server 300, the detailed information is acquired from the detailed information server 300 and displayed. At that time, if detailed information relating to program information is being acquired, the detailed information server 300 is access based on channel information for the program information being acquired, and program information for that channel is acquired. Alternatively, if detailed information relating to a setup menu is being acquired, the detailed information server 300 is accessed based on an identifier (for example, alphanumeric characters set in advance) that indicates the setup menu that acquires the detailed information.

On the other hand, if access to the detailed information server 300 is successful, but the detailed information does not exist in the detailed information server 300, the EPG information (simple information) that is transmitted by the broadcast waves is displayed, or nothing at all is displayed. Further, if access to the detailed information server 300 is unsuccessful due to not being connected to a network or such a reason, the system may be set such that the EPG information (simple information) that is transmitted by the broadcast waves is displayed, or nothing at all is displayed.

In this way, even when the detailed information does not exist in the detailed information server 300, or when the connection to the detailed information server 300 is broken, the information can be provided to the user by using the EPG information transmitted by the broadcast waves. As a consequence, more accurate and more diverse information can be provided to the user.

Second Embodiment

Figure 7:
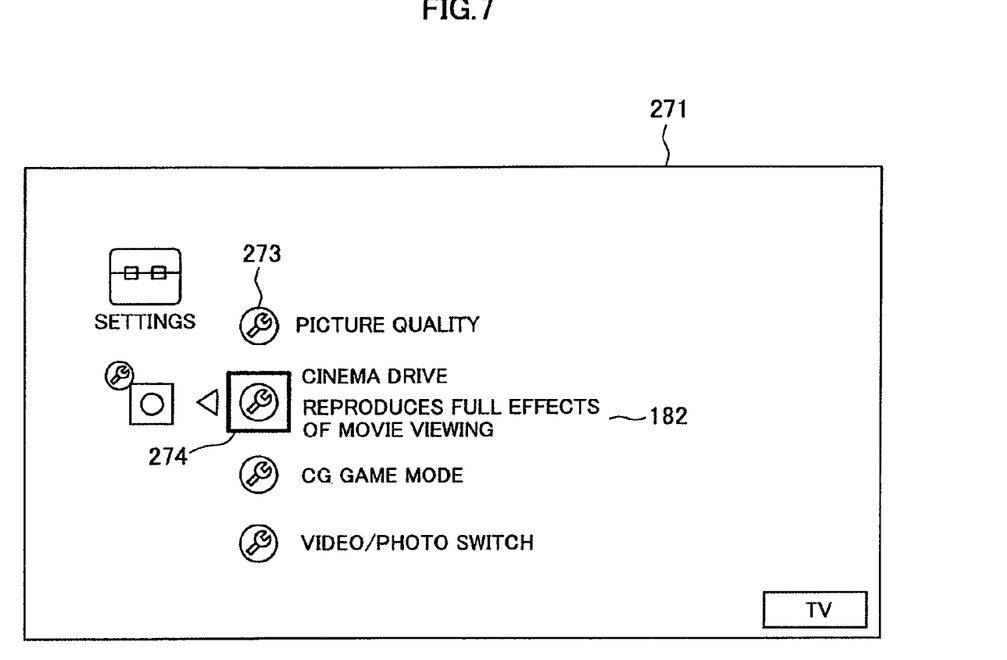
FIG. 7 is an explanatory diagram showing an example of a setting screen displaying simple information according to a second embodiment of the present invention.
Figure 8:
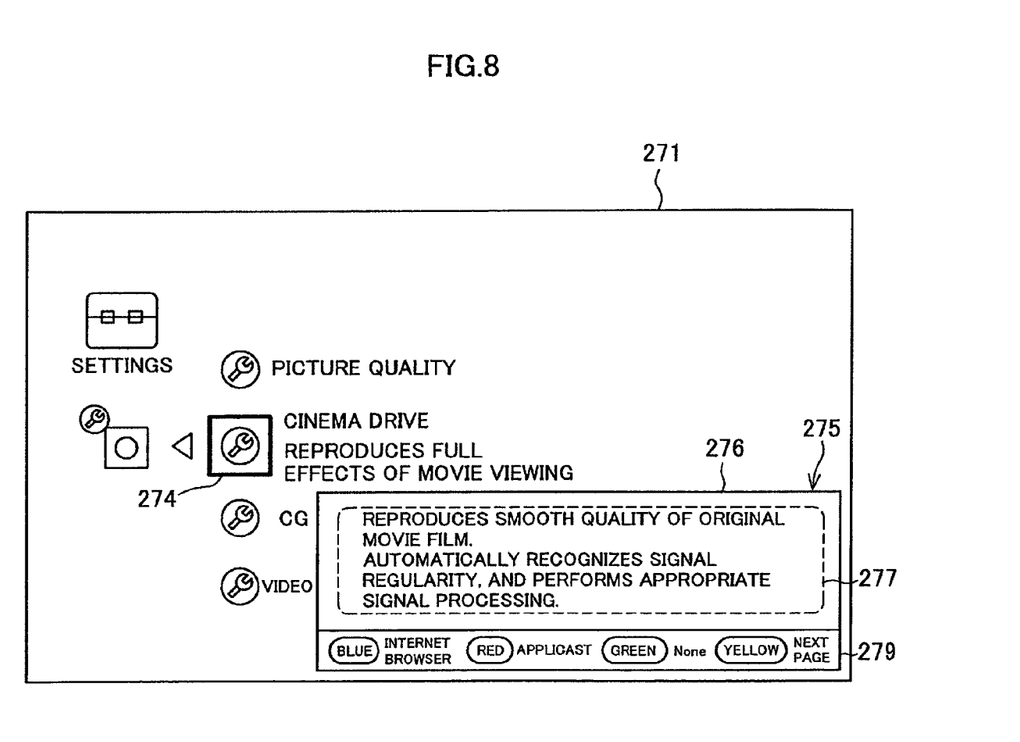
FIG. 8 is an explanatory diagram showing an example of a setting selection screen displaying detailed information according to the second embodiment.

Next, an information processing device according to a second embodiment of the present invention will be explained with reference to FIG. 7 and FIG. 8. The structure and the functions of the information processing device according to the second embodiment are the same as for the first embodiment, and an information display process by the information processing device is applied to the setting of device functions. Hereinafter, the information display process on a setting screen that performs device function settings will be explained in detail, and an explanation of the structure and the functions of the information processing device, which are the same as those of the first embodiment, will be omitted. Note that FIG. 7 is an explanatory diagram showing an example of a setting screen that displays simple information. FIG. 8 is an explanatory diagram showing an example of a setting screen that displays detailed information.

In the second embodiment, supplementary information is provided to determine a function that a user wishes to set on a setting screen 271 that performs settings for a device providing audio and images, such as a television and the like. The information display process according to the second embodiment is also performed using the process shown in FIG. 2, in the same way as the first embodiment. As shown in FIG. 7, functions that can be set are displayed on the setting screen 271, such as "picture quality" and "cinema drive" and the like. Icons 273 are provided that are each respectively linked to a process to perform the settings for each of the functions. The user uses the operation portion 140 to move at least one of a cursor 274 and the icons to position the cursor 247 on a specific icon 273 and thus provisionally select the icon 273. For example, simple information 182 is displayed beneath each function name relating to settings for the function. Note that in the second embodiment, the simple information 182 is information that is recorded in advance in the simple information recording portion 180 of the information processing device 100.

When the simple information 182 is displayed, the control portion 160 outputs a timer setting instruction to the timer 150 that is an instruction to perform an end of time period notification after a prescribed period of time has elapsed. The prescribed period of time set on the timer 150 can be, for example, approximately 2 to 10 seconds. Further, the period of time set on the timer may be set in advance or may be set by the user.

After the timer has started, if an operation is input from the operation portion 140 and the icon that is provisionally selected by the cursor 274 is changed, the timer 150 time period setting is made invalid, and simple information for the function settings linked to the newly selected icon is displayed. On the other hand, if no operation is input from the operation portion 140 after the timer has started, and the icon that is provisionally selected by the cursor 274 is not changed, in other words, when an end of time period notification is received from the timer 150, the control portion 160 acquires detailed information for the function settings displayed on the display portion.

At that time, the control portion 160 outputs a detailed information acquisition instruction to the detailed information acquisition portion 130 to acquire the detailed information that is linked to the icon positioned on the cursor 274. When the detailed information acquisition portion 130 receives the detailed information acquisition instruction, it first accesses the detailed information recording portion 190 and checks whether or not the detailed information linked to the icon is recorded. If the detailed information is recorded in the detailed information recording portion 190, the detailed information acquisition portion 130 acquires the detailed information from the detailed information recording portion 190 and outputs it to the control portion 160.

On the other hand, if the detailed information is not recorded in the detailed information recording portion 190, the detailed information acquisition portion 130 accesses the detailed information server 300 from the communication portion 135 via the communication network 200, and acquires the detailed information. The detailed information can be acquired from the detailed information server 300 based on, for example, the setting category information linked to the icon. Then, the detailed information acquisition portion 130 outputs the detailed information acquired from the detailed information server 300 to the control portion 160.

After that, the control portion 160 outputs the detailed information acquired from the detailed information recording portion 190 or from the detailed information server 300 to the display portion 170. The display portion 170 then displays the input detailed information. The detailed information is, for example, displayed on a poster 275 displayed on the setting screen 271. The poster 275 includes an explanatory display area 276 and an icon display area 279. A text display area 277 can be provided in the explanatory display area 276 that displays detailed information for function settings, using text for example. Moreover, an area may be provided to display images and video and so on that display an explanation of the function settings and setting methods.

Meanwhile, icons are displayed in the icon display area 279, such as an icon mapped to a process to start up an Internet browser, an icon mapped to a process to move to a next page when text information displayed in the text information display area 277 is formed of a plurality of pages and so on. The user can use the operation portion 140 to move at least one of either the cursor or the icons to select the required icon and thus perform the required process.

The information display process by the information processing device 100 according to the second embodiment is explained above. With the information processing device 100 according to the second embodiment, simple information is displayed when a function setting is provisionally selected, and if another operation is not performed during a prescribed period of time after that, detailed information is displayed. By this, the user can ascertain detailed information after a prescribed period of time has elapsed, without performing a separate operation.

It should be understood by those skilled in the art that various modifications, combinations, sub-combinations and alterations may occur depending on design requirements and other factors insofar as they are within the scope of the appended claims or the equivalents thereof.

For example, in the above-described embodiments, the first supplementary information and the second supplementary information are in a visual format, but the present invention is not limited to this example. An audio output portion may be provided in the information processing device, for example, and the supplementary information may be provided in an audio format.

Also, in the above-described embodiments, the icons have been explained as objects, but the present invention is not limited to this example. For example, as shown in FIG. 3, the icon and the area displayed to the right of the icon in which the simple information 182 is displayed can be thought of as a single object. The simple information 182 may be text or may be an image. In this case, the control portion 160, after performing a first process, performs a second process when it determines that a prescribed period of time has elapsed during which the cursor 174 remains in a state positioned on the above-mentioned area.

What is claimed is:

1. An information processing device comprising:
   a display portion that displays objects that respectively performed a function assigned in advance by being selected;
   an operation portion that inputs operation information to select one of the objects; and
   a control portion that causes supplementary information linked to the object to be displayed on the display portion, based on the operation information; wherein
   the control portion, based on predetermined conditions, performs a first process to display first supplementary information on the display portion, and, when the operation information is not newly input during a prescribed period of time after the first process is performed, performs a second process to acquire second supplementary information and display in a predetermined area on the display portion, the predetermined area being other than a second area on the display portion in which the first supplementary information is displayed in the first process, the second supplementary information and same information as the first supplementary information displayed for the first process simultaneously with the first supplementary information being displayed in the second area,
   wherein the control portion, with respect to a channel linked to the selected object, displays on the display portion at least one of the first or second supplementary information for current broadcast content that is content currently being broadcast in a first area portion of the predetermined area simultaneously with at least one of the first or second supplementary information for next broadcast content that is the content to be broadcast in a second area portion of the predetermined area, in which a ratio of an area size of the first area portion to an area size of the second area portion is changeable by a selection operation by a user with respect to the predetermined area,
   wherein the control portion, when a connection status of the information processing device is the information processing device is not connected via a communication network to an information server that holds the second supplementary information, determines a status of whether the supplementary information is possible to be acquired from broadcast waves.

2. The information processing device according to claim 1, wherein
   the control portion acquires the second supplementary information from the information server.

3. The information processing device according to claim 2, wherein
   the second supplementary information includes at least one of text detailed information, image information and video information that show a detailed description of content linked to the object.

4. The information processing device according to claim 2, further comprising:
   a detailed information recording portion that records the second supplementary information acquired from the information server; wherein
   the control portion, before connection to the information server, determines whether the second supplementary information linked to the selected object is recorded in the detailed information recording portion.

5. The information processing device according to claim 2, further comprising:
   a simple information recording portion that records simple information, that is the first supplementary information, for the content linked to the object.

6. The information processing device according to claim 5, wherein
   a device function setting is linked respectively to each of the objects, and
   the control portion displays simple information relating to the function setting as the first supplementary information, and
   displays detailed information relating to the function setting as the second supplementary information.

7. The information processing device according to claim 2, wherein
   a digital broadcast channel is respectively linked to each of the objects, and
   the control portion, depending on the connection status of the information processing device, acquires the second supplementary information from at least one of the information server and broadcast waves.

8. The information processing device according to claim 1, wherein
   an information display area that displays the second supplementary information is displayed on the display portion, and
   the control portion, based on progress information for the content currently being broadcast, determines a display ratio of the second supplementary information for the current broadcast content and the second supplementary information for the next content that are displayed on the information display area.

9. The information processing device according to claim 8, wherein
   the control portion, as the broadcast of the current broadcast content progresses, enlarges the display ratio of the second supplementary information for the next content in comparison to the display ratio of the current broadcast content on the information display area.

10. The information processing device according to claim 1, wherein
    the control portion performs the first process when one of the objects is positioned on a cursor to select the object.

11. An information providing method comprising the steps of:
    displaying objects that respectively performed a function assigned in advance by being selected;
    inputting operation information to select the object; and
    controlling display of supplementary information linked to the object, based on the operation information; wherein
    the step of controlling display of supplementary information includes the steps of
    first performing a first process to display first supplementary information on a display, based on predetermined conditions,
    second performing a second process to acquire and display in a predetermined area on the display when a prescribed period of time has elapsed without newly inputting the operation information after the first process has been performed, the predetermined area being other than a second area on the display in which the first supplementary information is displayed in the first process, second supplementary information and same information as the first supplementary information displayed for the first process simultaneously with the first supplementary information being displayed in the second area, wherein the second performing includes, with respect to a channel linked to the selected object, displaying on the display at least one of the first or second supplementary information for current broadcast content that is content currently being broadcast in a first area portion of the predetermined area simultaneously with at least one of the first or second supplementary information for next broadcast content that is the content to be broadcast in a second area portion of the predetermined area, in which a ratio of an area size of the first area portion to an area size of the second area portion is changeable by a selection operation by a user with respect to the predetermined area, and determining, when a connection status of the information processing device is the information processing device is not connected via a communication network to an information server that holds the second supplementary information, a status of whether the supplementary information is possible to be acquired from broadcast waves.

* * * * *